United States Patent
Mueller et al.

(10) Patent No.: US 12,027,891 B2
(45) Date of Patent: Jul. 2, 2024

(54) DISPLAY DEVICE FOR DISPLAYING SYSTEM STATES OF AT LEAST TWO ELECTRICAL CONSUMER DEVICES, HOUSEHOLD APPLIANCE, PIECE OF FURNITURE, METHOD FOR OPERATING A DISPLAY DEVICE, STORAGE MEDIUM, MOBILE, PORTABLE TERMINAL, AND SERVER FOR OPERATING ON THE INTERNET

(71) Applicant: AUDI AG, Ingolstadt (DE)

(72) Inventors: Ulrich Mueller, Ingolstadt (DE); Jacques Helot, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 634 days.

(21) Appl. No.: 17/268,208

(22) PCT Filed: Jul. 26, 2019

(86) PCT No.: PCT/EP2019/070231
§ 371 (c)(1),
(2) Date: Feb. 12, 2021

(87) PCT Pub. No.: WO2020/035290
PCT Pub. Date: Feb. 20, 2020

(65) Prior Publication Data
US 2021/0320510 A1   Oct. 14, 2021

(30) Foreign Application Priority Data
Aug. 14, 2018   (DE) ..................... 10 2018 213 643.2

(51) Int. Cl.
*H02J 7/00*   (2006.01)
*B60L 53/66*   (2019.01)

(52) U.S. Cl.
CPC .......... *H02J 7/0013* (2013.01); *B60L 53/665* (2019.02); *H02J 7/0048* (2020.01); *H02J 7/0049* (2020.01)

(58) Field of Classification Search
USPC ........................................................ 320/107
See application file for complete search history.

(56) References Cited

U.S. PATENT DOCUMENTS

| 2005/0035854 A1 | 2/2005 | Gupta et al. |
| 2013/0225082 A1 | 8/2013 | Kang et al. |

(Continued)

FOREIGN PATENT DOCUMENTS

| CN | 102163985 | 8/2011 |
| CN | 103010040 | 4/2013 |

(Continued)

OTHER PUBLICATIONS

Translation by WIPO dated Feb. 18, 2021 of International Preliminary Report on Patentability for International Application No. PCT/EP2019/070231, 7 pages.

(Continued)

*Primary Examiner* — Bryce M Aisaka
(74) *Attorney, Agent, or Firm* — STAAS & HALSEY LLP

(57) ABSTRACT

A display having at least two display surfaces, a controller and a communication interface for receiving charge state signals are provided in a display device. Each charge state signal describes the respective charge state of one of multiple electrical consumer devices. The control device determines the charge state of each electrical consumer device based on the charge state signals received. Then the control device generates image signals, each defining an image representing one of the detected charge states and transmits the image signals to the display. The image of each detected (Continued)

charge state is displayed on a display surface assigned to the respective electrical consumer device. The display device may be part of a household appliance, or an item of furniture.

18 Claims, 2 Drawing Sheets

(56) References Cited

U.S. PATENT DOCUMENTS

| | | | |
|---|---|---|---|
| 2014/0049221 A1 | | 2/2014 | Nishide |
| 2014/0266008 A1* | | 9/2014 | Partee .................. H01M 10/441 |
| | | | 320/152 |
| 2015/0372518 A1 | | 12/2015 | Toya et al. |
| 2016/0162241 A1* | | 6/2016 | An ........................ G06F 1/1641 |
| | | | 345/1.3 |
| 2016/0315832 A1* | | 10/2016 | Hu ........................ H04L 67/125 |
| 2017/0127196 A1 | | 5/2017 | Blum et al. |
| 2017/0133881 A1 | | 5/2017 | Cho et al. |
| 2017/0201132 A1 | | 7/2017 | Hoque et al. |
| 2017/0269167 A1 | | 9/2017 | Willey |
| 2018/0032818 A1* | | 2/2018 | Abraham ............... G06V 40/10 |
| 2018/0351373 A1* | | 12/2018 | Behzadi .............. G06F 3/04842 |

FOREIGN PATENT DOCUMENTS

| | | |
|---|---|---|
| CN | 107204640 | 9/2017 |
| DE | 10 2012 009 018 A1 | 11/2013 |
| DE | 20 2015 102 253 U1 | 7/2015 |
| DE | 10 2014 211 064 A1 | 12/2015 |
| DE | 10 2015 014 238 A1 | 7/2016 |
| DE | 10 2015 106 316 A1 | 10/2016 |
| DE | 10 2015 226 152 A1 | 6/2017 |
| DE | 10 2018 213 643.2 | 8/2018 |
| WO | PCT/EP2019/070231 | 7/2019 |

OTHER PUBLICATIONS

International Search Report dated Oct. 11, 2019 from International Application No. PCT/EP2019/070231, 6 pages.
German Office Action dated Jun. 3, 20191 from German Application No. 10 2018 213 643.2, 10 pages.
Chinese Office Action dated Mar. 2, 2024 from Chinese Application No. 201980053209.5.

* cited by examiner

DISPLAY DEVICE FOR DISPLAYING SYSTEM STATES OF AT LEAST TWO ELECTRICAL CONSUMER DEVICES, HOUSEHOLD APPLIANCE, PIECE OF FURNITURE, METHOD FOR OPERATING A DISPLAY DEVICE, STORAGE MEDIUM, MOBILE, PORTABLE TERMINAL, AND SERVER FOR OPERATING ON THE INTERNET

CROSS REFERENCE TO RELATED APPLICATIONS

This application is a U.S. national stage of International Application No. PCT/EP2019/070231, filed on Jul. 26, 2019. The International Application claims the priority benefit of German Application No. 10 2018 213 643.2 filed on Aug. 14, 2018. Both the International Application and the German Application are incorporated by reference herein in their entirety.

BACKGROUND

Described below is a display device for displaying the system states of at least two electrical consumer devices. An electrical consumer device is an electrical power consuming device, which can be, for example, an electric motor vehicle, a smartphone or a smartwatch.

Electric vehicles and many electrical devices are operated with rechargeable batteries, which must be continuously recharged. This includes devices such as smartphones, smartwatches, tablets, laptops, toothbrushes and many more. Almost all such devices can display their own charge state.

Most households, however, have a plurality of smartphones, smartwatches, tablets, and so on, thus it can be difficult to monitor their charge state. Retrieving the charge state information of an electric vehicle, possibly also several vehicles, often requires a complicated process involving an app, if the user is not in the vehicle.

DE 10 2015 226 152 A1 describes a display device that comprises an electronically controllable display element for displaying graphics, a mirror unit in which an object is displayed as a mirror image, and a data interface configured to retrieve and/or receive mobility-related data from at least one data source. The device can be used to monitor the charge state of an electric vehicle. It does not, however, offer any clear advantage in comparison to an app.

SUMMARY

The method described herein is able to improve monitoring of the charge states of a plurality of devices.

The idea is to provide a display device that displays the charge state of a plurality of devices. For this purpose, the display device is designed with a communication device for receiving charge state signals, as well as with a control device that can generate an image representing the detected charge state of the respective device for each charge state. This provides an advantageous charge-state collator, which connects all devices together and displays the current charge states of all devices and vehicles in the household. This allows the current charge states to be read quickly and clearly.

The display device displays system states of at least two electrical consumer devices on a display with at least two display surfaces. A display is a component or device component designed to output graphical information, such as a display screen. The at least two display surfaces can be arranged directly adjoining one another and each designed as a display area of a screen surface, or, for example, arranged separately in the display device.

The display device includes a communication interface for receiving charge state signals, wherein each charge state signal describes a respective charge state of one of the at least two electrical consumer devices. A communication device is a device component for data communication, for example a WLAN module or a Bluetooth module.

The display device also has a control device configured to determine the charge state of the respective electrical consumer device based on each of the charge state signals received, to generate an image signal which describes an image representing the respective detected charge state, such as a quantitative charge state, as a function of each of the detected charge states, and to transmit each of the generated image signals to the display, so that the respective image is displayed on a display surface assigned to the respective electrical consumer device. For example, an image signal can describe each image of the respective electrical consumer device, or a separate image signal can be generated for each of the images.

A control device is a device component for receiving and evaluating signals, which is also configured to generate image signals. The control device can be designed, for example, as a control circuit board or a control chip.

This results in the advantages mentioned above. The above-mentioned disadvantages are reduced or even eliminated. When implemented in a motor vehicle, the display device has the additional advantage that, by simplifying the monitoring of several devices, for example, a driver of the vehicle only needs to look very briefly and less often at the display surfaces, and thus can devote much more attention to the driving process. An additional advantage provided is that the user of the motor vehicle is less anxious, as they have an overview of all their devices, and this also significantly increases driving safety. Information about the charge states of at least two electrical consumer devices is always accessible and always visible.

The control device can be configured to detect an interruption of a data communication connection to one of the electrical consumer devices, and, on the detection of an interruption of the data communication connection, to predict the current charge state of the electrical consumer device based on empirical data, and generate the image signal depending on the predicted charge state, which can describe the image representing the respective predicted, as a quantitative charge state. For example, if the electric motor vehicle is not sufficiently near to the display device, for example, if the display device is in a house and someone has just driven the electric motor vehicle away, the display device can nevertheless reliably provide information on what the charge state of the exemplary electric motor vehicle is expected to be. This eliminates the necessity for a permanent data communication connection.

The empirical data can be historical data on the charge state of the electrical consumer device, which may be stored, for example, in a data memory of the display device. In addition or alternatively, if the electrical consumer device is an electric motor vehicle, the empirical data can be data on a current travel route of the motor vehicle. In addition or alternatively, the empirical data can be appointment calendar data, which can be synchronized, for example, at regular intervals from a users mobile phone. This allows the charge state to be predicted with particular precision.

A particularly efficient management of the charge states can be achieved if the control device is configured to verify whether one of the detected charge states meets a recharge requirement criterion, wherein the recharge requirement criterion can describe a fall below a specified minimum charge state of the respective electrical consumer device. If the recharge requirement criterion is met, the control device can generate a warning signal and transmit it to the display, wherein the warning signal generated can describe a warning that the charge state of the corresponding electrical consumer device has fallen below the specified minimum charge state.

The communication device can be configured to provide a data communication connection for communication with at least two electrical consumer devices, where at least one of the data communication connections may be a wireless data communication connection. With such a wireless coupling, all electrical consumer devices in a household, for example, can be recorded quickly and easily.

An additional function is provided by the display device according to a further embodiment in which the display device may have a charging device for charging an electrical consumer device. A charging device is a component or component assembly for the provision of electrical current. A device, such as a smartphone, can then be connected to the display device, for example, via a USB port. The display device can have an energy storage device for this function, i.e. a component or a device component for storing energy, i.e. electrical current.

A household appliance may be equipped with an embodiment of the display device. This results in the advantages mentioned above. The household appliance can be designed as a refrigerator, which can have, for example, a display device in the form of a screen on the outside of the door or inside it. When designed as a refrigerator, the advantage is provided that, for example, when the household appliance is used regularly, a user is always able to immediately see whether they need to recharge an appliance for the next day.

An item of furniture also may be equipped with an embodiment of the display device. The item of furniture may be designed as a mirror. For example, the exemplary mirror can be designed as a semi-transparent mirror, which can have a bright display behind the semi-transparent mirror surface. In this embodiment, the user sees the charge states of their devices at regular intervals and can take care of the recharging in good time, for example, when they clean their teeth in the morning or evening.

A motor vehicle may be equipped with an embodiment of the display device. The motor vehicle may be designed as a road vehicle, for example as a passenger car. This results in the advantages mentioned above.

A method for operating an embodiment of the display device is described below, wherein a control device of the display device performs the method. Here also, the advantages mentioned above are obtained.

The control device may determine the charge state of the respective electrical consumer device based on each of the charge state signals received; generate an image signal which describes an image representing the respective detected charge state, such as a quantitative charge state, depending on each of the detected charge states; and transmit each of the generated image signals to the display so that the respective image is displayed on a display surface assigned to the respective electrical consumer device. For example, an image signal can describe each image of the respective electrical consumer device, or a separate image signal can be generated for each of the images.

There are extensions of the method which have features that have already been described in the context of the extensions of the display device. For this reason, the corresponding extensions of the method are not described again here.

A storage medium stores program code configured to perform a method according to an embodiment when executed by a processor device. This results in the advantages mentioned above. A processor device is a component or component assembly for electronic data processing. The processor device can have at least one microcontroller and/or a microprocessor. The storage medium can be designed as a memory chip or memory card.

A mobile, portable terminal device, for example a smartphone or a smartwatch may have a storage medium according to an embodiment. This results in the advantages mentioned above.

The above-mentioned advantages are also obtained by a server for operation via the internet, in which an embodiment of the storage medium is provided. A server device is, for example, a computer, a data cloud, a computer network, or another type of data server.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

The exemplary embodiments described in the following relate to embodiments. In the exemplary embodiments, the components of the embodiments described represent individual features to be considered independently of each other. Therefore, the disclosure is also intended to include combinations of the features in the embodiments other than those represented. Furthermore, the embodiments described can also be extended to include other features already described.

In the figures identical reference signs designate functionally equivalent elements.

Figure 1:
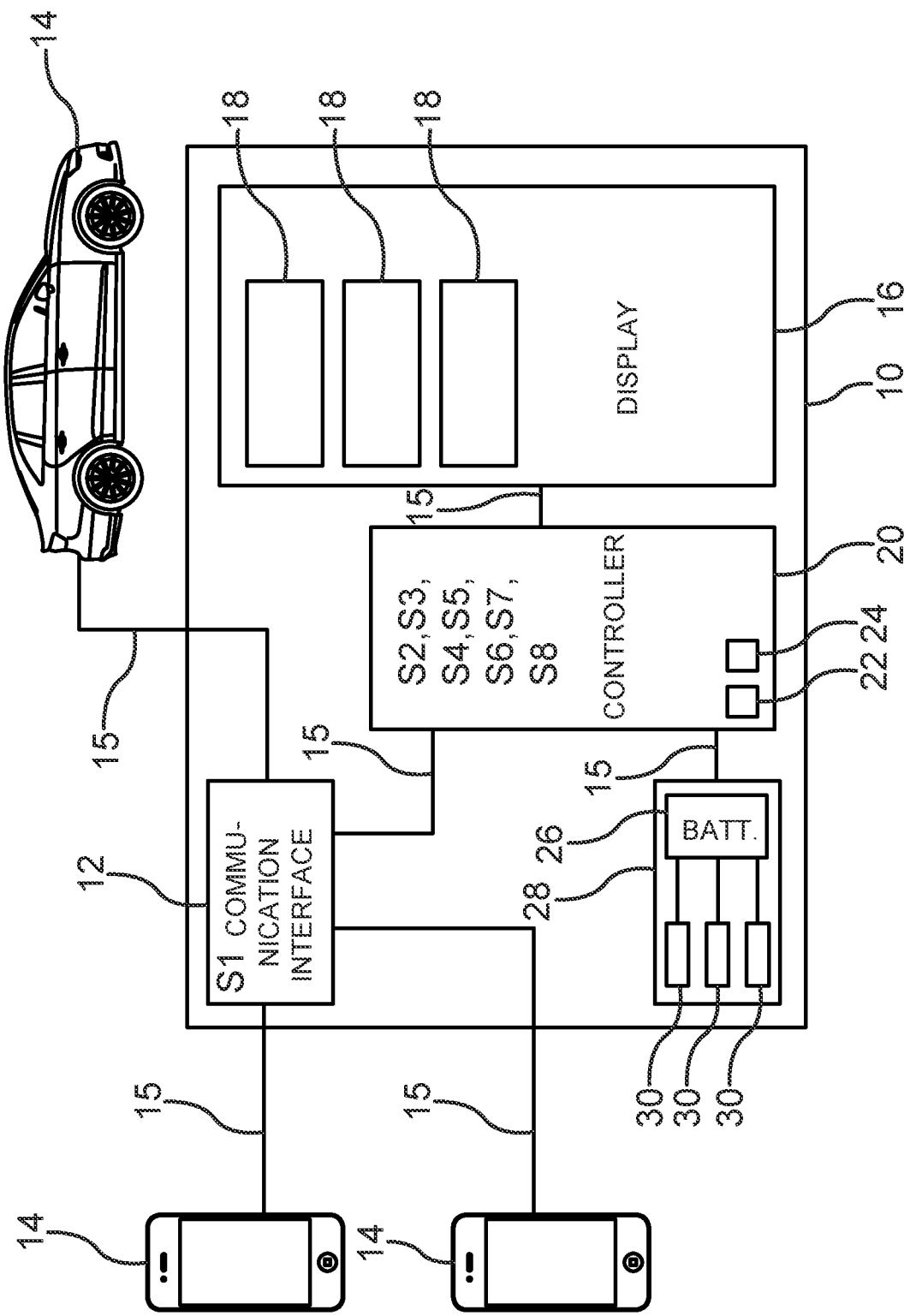
FIG. 1 is a schematic representation of a first embodiment of the display device and of a first embodiment of the method.

FIG. 1 illustrates the principle of the display device 10 by reference to a first exemplary embodiment. The display device can be designed, for example, as a portable device or as a component of a motor vehicle (not shown in FIG. 1).

The display device 10 has a communication interface 12, for example a WLAN module or a Bluetooth module. Via the communication interface 12, the display device 10 can establish a data communication connection 15 with each of the electrical consumer devices 14. The data communication connection 15 can be a wireless data communication connection. In the example in FIG. 1, three electrical consumer devices 14 are shown, for example two smartphones and a motor vehicle, which can be designed as an electric motor vehicle. If the display device 10 is a component of the motor vehicle, the corresponding data communication connection 15, for example, for an energy management of the electric motor vehicle, can be a wired data communication connection 15, for example, a data bus of the motor vehicle.

Figure 2:
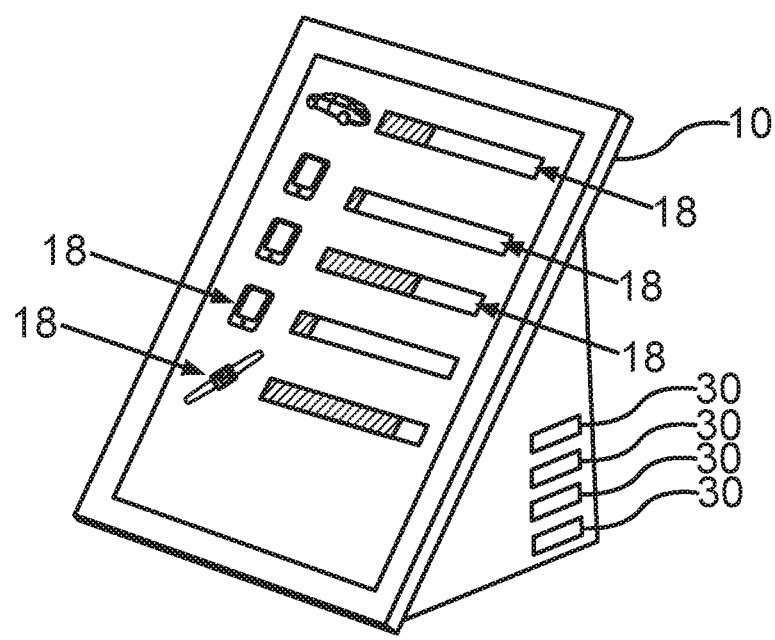
FIG. 2 is a schematic representation of a further embodiment of the display device.

The display device 10 has a display 16, which can be designed as a display screen, for example. For example, the display 16 can have at least three display surfaces 18, which can optionally also be referred to as display fields formed on a single surface, as illustrated in FIG. 2. In the example of FIG. 1, the display surfaces 18 can make up the entire display surface of the display 16. Alternatively, the display surfaces 18 can be independent display surfaces 18 separate from one another.

The display device 10 has a controller 20, which can be designed, for example, as a control chip or control circuit board. Optionally, the control device 20 can have a processor device 22, and/or a storage medium 24. The storage medium 24 can also be referred to as a data memory. The control device 20 is configured to control the display 16, as explained in detail below.

The exemplary display device 10 in the example in FIG. 1 also shows an optional charging device 28, which can include, for example, an energy storage device 26 and a plurality of charging sockets 30. For example, the energy storage device 26 can be configured as a rechargeable battery or lithium battery, and the charging sockets can be configured as USB2A ports, for example. To recharge one of the electrical consumer devices 14, it can be plugged into one of the charging sockets 30, for example, via a charging cable. During a charging process, it can optionally be provided that information can be displayed via the display 16 as to which electrical consumer device 14 is currently being charged, optionally also information about the charging current and/or the remaining charging time. For this purpose, display text with the information "motor vehicle is currently being charged with 8 A" and/or "7 hours of charging process remaining", for example, can be displayed.

In S1, the communication interface 12 receives a charge state signal from each of the electrical consumer devices 14, wherein, for example, the charge state signal from the exemplary motor vehicle can describe that a battery of the motor vehicle can currently be 30 percent charged. For example, a charge state signal from a first smartphone can describe that it can currently be 4 percent charged, and a charge state signal from another smartphone can describe that it can currently be 35 percent charged.

Alternatively, a charge state signal can describe another parameter, such as a planned route of the motor vehicle. The charge state signal can then be received, for example, from a navigation device of the exemplary motor vehicle.

To determine the respective charge state (S2) via the control device 20, for example, the communication interface 12 can transmit the respective charge state signal to the control device 20. For example, by reading the two charge state signals from the two exemplary smartphones, the control device 20 can determine (S2) their current charge state directly, whereas, for example, the charge state signal of the motor vehicle, which can describe a planned travel route, can be used to predict (S3) or estimate (S2) the charge state. Predicting (S3) the charge state is particularly advantageous if the control device 20 optionally detects (S4) an interruption of the data communication connection with the exemplary motor vehicle.

For example, for an electrical consumer device 14 that may be beyond the range of the communication interface 12, appropriate information can be displayed, such as a gray bar or a flashing symbol.

If the current charge state is not directly described by the charge state signal, for example as a percentage figure, conversion to a percentage can be performed, for example, based on the above-mentioned planned travel route, or on the basis of other empirical values, for example historical data, which can describe how often a smartphone user uses the smartphone and how often they need to charge it, for example. Alternatively, appointment calendar data, for example, can be used for the prediction S3, which can be requested from the exemplary smartphone and/or can be stored in the storage medium 24. For example, the appointment calendar data can describe dates when it is necessary to use the motor vehicle, so that information can be indirectly inferred about the use and thus the energy consumption of the motor vehicle.

A conversion to, for example, a charging time or percentage figure can optionally be configured by the user on a computer.

In this respect, from such empirical values the control device 20 can also use data from a motor-vehicle-specific data server (not shown in FIG. 1), for example from a data cloud.

If, for example, the control device 20 determines that one of the electrical consumer devices 14 falls below (S5) a threshold value, i.e. a minimum charge state, the control device 20 can optionally generate a warning signal, which can describe a corresponding warning of the critical charge state (S6). Such a warning signal may be an image signal that can be output by the display 16.

As a function of each of the detected charge states, the control device 20 generates a respective image signal in S7, which can, for example, be in the form of a bar graph and/or a numerical indication of the current charge state, for example a numerical percentage figure. For example, if the electrical consumer device 14 is a smartphone or a watch, the indication of the charge state can alternatively be specified as a remaining period of time, for example in a number of hours for which power is still available.

The image signals are then transmitted (S8) to the display 16, wherein a display surface 18 can be assigned to each of the electrical consumer devices 14.

FIG. 2 shows an exemplary embodiment of the display device 10, in which the display device 10 can be designed as a portable unit, for example. The display device 10 can correspond to the display device 10 of the example of FIG. 1 in its structure and functioning. For example, in each of the display surfaces, the current (or predicted) charge state can be displayed as a bar graph, with an optional display of an icon of the corresponding electrical consumer device 14, and, optionally, a descriptive text for the bar graph of the corresponding electrical consumer device 14. For example, the display device 10 of the example of FIG. 2 above can display a bar graph of a charge state of 30 percent of a "motor vehicle 1 e-tron", a bar graph showing a charge state of 4 percent, for example, for the "iPhone Max", a bar graph showing a charge state of 35 percent for an "iPhone Julia", a bar graph showing a charge state of 7 percent for, for example, "Joseph's iPhone," and a bar graph showing a charge state of 95 percent for an "iWatch."

Figure 3:
FIG. 3 is a schematic representation of a further embodiment of the display device.

FIG. 3 shows another exemplary embodiment, wherein an item of furniture 32, which can be designed as a mirror, can include an embodiment of the display device 10. For example, the mirror may have a semi-transparent mirror surface, as known to the person skilled in the art from the related art, behind which a bright display can be arranged as a display 16 of the display device 10. Alternatively, the item of furniture 32 can be described as a display device 10.

For example, if the display device 10 is designed as a refrigerator, or if a household appliance in the form of a refrigerator, the display may be located in an interior of the exemplary refrigerator, for example.

Overall, the exemplary embodiments show how a display device 10 can also be called a "charge state collator".

The display device 10, which can also be called a charge-state display unit, shows the charge state of all devices in a household, for example. This means that the current charge state can be read quickly and clearly. For example, all devices and/or vehicles coupled with the display device 10 can be displayed. The following can also be optionally displayed: a current charge state in kilometers for vehicles; and/or a remaining charging time; and/or devices that are out of range; and/or a charging current and/or a charging voltage. Optionally, the system can learn which electrical consumer device 14, for example, which device and/or which vehicle, can normally have which charge state and when, and can warn if/in case the charge state is not sufficient for further anticipated use, for example, if a smartwatch does not have enough charge for the whole day in the morning.

In a further exemplary embodiment, the display device 10, which can also be called a charge state indicator, can also run as a user program ("app") on a smartphone, tablet PC, PC or other mobile or stationary devices, for example. Optionally, the display device 10 can be used as a charging device. For this purpose, USB charging sockets can be installed, for example.

According to a further exemplary embodiment, integration into other household objects can be conceivable, for example, a mirror or a refrigerator.

This results in the advantages mentioned in the exemplary embodiments above.

According to a further exemplary embodiment, a technical implementation may, for example, provide an appropriate receiver and electronics unit, i.e. a combination of the communication interface 12 and the control device 20. The exemplary receiver and electronics unit can evaluate charge state signals sent via a Bluetooth or WLAN connection, for example, and display them on a display screen, for example.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A display device for displaying system states of at least two electrical consumer devices, the display device comprising:
    a display having at least two display fields;
    a communication interface configured to receive charge state signals, each charge state signal representing a charge state of one of the electrical consumer devices; and
    a controller configured to:
        determine the charge state of a respective electrical consumer device for each of the charge state signals received and predict charge state information of one of the electrical consumer devices in response to a data communication interruption to the one of the electrical consumer devices,
        generate an image signal defining an image representing the charge state for each of the charge state signals, and
        transmit the image signal for each of the charge state signals to the display,
    wherein the display displays the image on a corresponding display field assigned to each of the electrical consumer devices, respectively, and displays the predicted charge state information.

2. The display device according to claim 1, wherein the controller is further configured to
    detect the data communication interruption to the one of the electrical consumer devices,
    predict, upon detection of the data communication interruption, current charge state information of the one of the electrical consumer devices, based on empirical data, and
    generate, depending on the current charge state information predicted by the controller, a predicted image signal defining the image representing the current charge state predicted by the controller.

3. The display device according to claim 2, wherein the empirical data are at least one of historical data on the charge state of the one of the electrical consumer devices; when the electrical consumer device is an electric motor vehicle, data on a current travel route of the electric motor vehicle; and appointment calendar data.

4. The display device according to claim 1,
    wherein the controller is further configured to
        verify whether the charge state represented by one of the charge state signals meets a recharge requirement criterion indicating a fall below a specified minimum charge state of a corresponding electrical consumer device,
        generate, when the recharge requirement criterion is met, a warning signal, and
        transmit the warning signal to the display, and
    wherein the display, in response to receipt of the warning signal, displays a warning that the charge state of the corresponding electrical consumer device has fallen below the specified minimum charge state.

5. The display device according to claim 1, wherein the communication interface is configured to provide data communication connections for communication with the at least two electrical consumer devices, respectively, at least one of the data communication connections being a wireless data communication connection.

6. The display device according to claim 1, wherein the display device further comprises a charging device for charging one of the electrical consumer devices.

7. A household appliance, comprising the display device according to claim 1.

8. An item of furniture, comprising the display device according to claim 1.

9. The item of furniture according to claim 8, wherein the item of furniture is a mirror.

10. A motor vehicle, comprising the display device according to claim 1.

11. A method for operating a display device, comprising:
    receiving charge state signals from at least two electrical consumer devices, respectively;
    determining a charge state of each of the electrical consumer devices based on the charge state signals and predicting charge state information of one of the electrical consumer devices in response to a data communication interruption to the one of the electrical consumer devices;
    generating an image signal defining an image representing the charge state for each of the charge state signals; and
    displaying the image represented by the image signal for each of the charge state signals on a display in a corresponding display field assigned to each of the electrical consumer devices, respectively, and displaying on the display the predicted charge state information.

12. The method according to claim 11, further comprising:
   detecting the data communication interruption to the one of the electrical consumer devices;
   predicting, upon detection of the data communication interruption, current charge state information of the one of the electrical consumer devices, based on empirical data; and
   generating, depending on the current charge state information predicted by the controller, a predicted image signal defining the image representing the current charge state predicted by the controller.

13. The method according to claim 12, wherein the empirical data are at least one of historical data on the charge state of the one of the electrical consumer devices; when the electrical consumer device is an electric motor vehicle, data on a current travel route of the motor vehicle; and appointment calendar data.

14. The method according to claim 12, further comprising:
   verifying whether the charge state represented by one of the charge state signals meets a recharge requirement criterion indicating a fall below a specified minimum charge state of a corresponding electrical consumer device;
   generating a warning signal when the recharge requirement criterion is met; and
   displaying, in response to the warning signal, a warning that the charge state of the corresponding electrical consumer device has fallen below the specified minimum charge state.

15. The method according to claim 14, further comprising providing data communication connections for communication with the at least two electrical consumer devices, respectively, at least one of the data communication connections being a wireless data communication connection.

16. A non-transitory storage medium storing program code which when executed by a processor performs the method recited in claim 11.

17. A portable terminal, comprising the non-transitory storage medium according to claim 16.

18. A server connected via the internet, comprising the non-transitory storage medium according to claim 16.

* * * * *